United States Patent Office 3,529,490
Patented Sept. 22, 1970

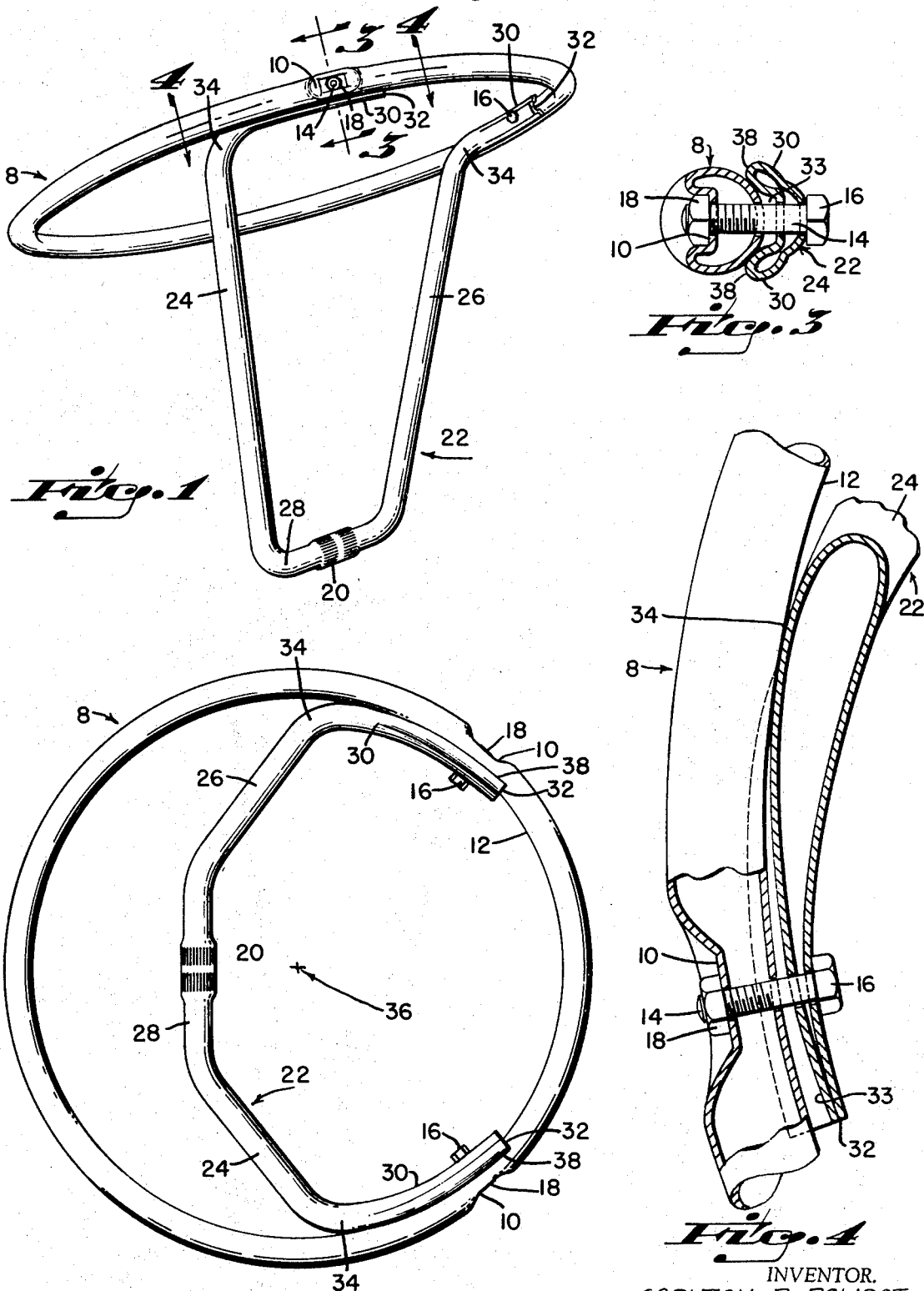

3,529,490
BICYCLE HANDLEBAR
Carlton P. Pawsat and Robert Francis Humlong, Maysville, Ky., assignors to Wald Manufacturing Company, Incorporated, Maysville, Ky., a corporation of Kentucky
Filed Aug. 13, 1968, Ser. No. 752,378
Int. Cl. B62k 21/12
U.S. Cl. 74—551.1
10 Claims

ABSTRACT OF THE DISCLOSURE

The handlebar is constructed simply and economically of two tubular parts secured to one another by two bolts, one of said tubular parts being a horn member having divergent arms developed to provide end saddles each making a sturdy separable connection with the other tubular part which comprises the hand grip member.

---

This invention relates to a handlebar for bicycles or similar vehicles.

An object of the invention is to provide an unusual type of handlebar which is attractive to cyclists, in that it promotes the illusion of steering a larger four-wheeled vehicle such as an automobile or race car.

Another object of the invention is to provide a novel type of handlebar which facilitates guiding of a bicycle, and reduces the likelihood of fatigue by furnishing arm rests conveniently located.

A further object of the invention is to provide a handlebar of the character stated, which is structurally strong, highly attractive in appearance, and manufacturable with ease and economy.

The foregoing and other objects are attained by the means described herein and illustrated upon the accompanying drawing, in which:

FIG. 1 is a side perspective view of the handlebar of the present invention.

FIG. 2 is a top plan view of the same.

FIG. 3 is an enlarged cross-section taken on line 3—3 of FIG. 1.

FIG. 4 is an enlarged cross-section taken on line 4—4 of FIG. 1.

The improved handlebar is made up of only two formed metal parts, and two nuts and bolts which hold the metal parts in assembled relationship. The two main parts are easily formed on standard bending and forming machinery.

One of the two main parts is a grip member 8 having two depressions or sockets 10, 10 formed into the outermost wall portion of the grip member, leaving the innermost wall portion 12 unaltered as to contour. Each depression or socket 10 is drilled centrally and through the grip member radially thereof, to receive a bolt 14 whose head 16 is disposed inside the grip member as shown. The threaded end of each bolt is receptive of a nut 18, to be removed when applying the handlebar to the usual steering stem. The steering stem usually includes a contractible sleeve or clamp barrel receptive of the serrated cylindrical enlargement or clamp journal 20 of the handlebar structure.

The second main part of the handle-bar is a substantially U-shaped horn member 22, fabricated from bent and formed metal tubing to provide two upwardly divergent arms 24 and 26 of equal length connected at their lower ends by an integral connecting portion 28 which includes clamp journal 20.

The upper end portions 30, 30, of the arms 24 and 26 are bent to converge toward one another, and each such end portion is curved longitudinally on an arc having the same approximate radius as grip member 8. In addition, the end portions 30 are progressively concaved to a depth which is maximal at the free ends 32 thereof, so as to provide an elongate saddle 33 in which is received a substantial section of the grip member inner wall 12. The bolts 14 normally secure short sections of the grip member upon the arched saddles, which saddles extend from the free ends 32 to the approximate locations of the bends 34, 34 which define the end portions 30.

FIG. 3 illustrates how bolt 14 anchors a portion of the length of grip member 8 within the saddle 33. The longitudinal and transverse bends applied to the end portions 30, 30, including formation of the saddle 33, produces sturdy, neat and effective joints presenting no sharp edges to injure the cyclist. The joints or connections between the constituent parts require a total of only two fasteners 14, which are sufficient to produce rigid, durable and dependable connections.

The curved end portions 30, 30 of horn member 22 lie in a common plane with grip member 8, but arms 24 and 26 meet said plane at an acute angle such that clamp journal 20 is closer to the perpendicular center of the grip member than to the rim thereof. This is best illustrated by FIG. 2, wherein clamp journal 20 is seen to be closer to the center 36 than to any portion of the rim of the grip member.

The socket 10 is constricted preferably as to width, for close reception of opposite flats of fastener nut 18, (FIG. 3), so that the nut is thereby held against turning when fastener head 16 is rotated. When head 16 of FIG. 3 is rotated to tighten the connection shown, the oppositely extended wings 38, 38 which define saddle 33 will exert a yielding force against member 8 tending to spread the wings apart. The inherent resiliency of the wings 38, 38 enhances the connection between parts 8 and 22, and makes unnecessary the use of lock washers.

To apply the handlebar to a steering stem sleeve or clamp barrel, it is necessary only to remove the two bolts which secure the grip member 8 to the horn member 22, so that one end of the horn member may be passed through the clamp barrel until the serrated journal 20 rests within the barrel. The barrel may then be contracted and clamped about journal 20. The grip member 8 may then be applied to horn member 22 in accordance with FIG. 2, and secured thereto by means of the fasteners 14, 14.

The improved handlear greatly enhances the appearance of any bicycle to which it is applied, and will be found effective as an aid to steering with ease and convenience. Moreover, the handlebar is structurally strong and economical to manufacture.

The accompanying drawing discloses the grip member 8 as a fully circular hoop or ring member; however, the invention contemplates also a grip member which may not be fully circular, if desired. That is, for example, one-fourth to one-third of the hoop in FIG. 2 might be cut away and removed as an arcuate section, at the left of journal 20, so that the grip member no longer is fully circular of contour.

What is claimed is:

1. A handlebar for bicycles and the like, comprising in combination: a tubular grip member curved in a plane; a horn member comprising a pair of divergent arms and a connecting portion including a clamp journal, said divergent arms each intersecting said plane at an angle, said arms having end portions with terminal ends convergent toward one another in the plane of the grip member; and means for detachably securing said convergent end portions of the arms to the grip member in the plane of said grip member.

2. The handlebar as specified by claim 1, wherein the end portions of the arms are integral extensions of said arms curved linearly to the approximate curvature of the grip member, and said end portions are formed to provide saddles receptive of portions of the grip member.

3. The handlebar as specified by claim 2, wherein the detachable securing means comprises a pair of bolts disposed substantially radially of the grip member and in the plane of the latter, said bolts passing through holes in the grip member and registering holes in the end portions of the horn member arms.

4. The handlebar as specified by claim 1, wherein the detachable securing means comprises a pair of bolts disposed substantially radially of the grip member and in the plane of the latter, said bolts passing through holes in the grip member and registering holes formed in the end portions of the horn member arms.

5. The handlebar as specified by claim 3, wherein each of the bolts has a head on one end thereof and a polygonal nut on the other end, and the grip member is recessed in its outer periphery to accommodate the nuts applied to said bolts.

6. The handlebar as specified by claim 5, wherein each recess in the grip member has opposite parallel faces to abut opposite faces of the nut, to preclude rotation of the nut with the bolt.

7. The handlebar as specified by claim 2, wherein each of said saddles includes a pair of elongate parallel side wings embracing a longitudinal curved portion of the grip member, said side wings being inherently resilient and held against the grip member by said detachable securing means.

8. The handlebar as specified by claim 5, wherein each of said saddles includes a pair of elongate parallel side wings embracing a longitudinal curved portion of the grip member, said side wings being inherently resilient and held against the grip member by said bolts and applied nuts.

9. A handlebar for bicycles and the like, comprising in combination: a planar grip member substantially circular of shape having an outer wall surface and an inner wall surface apertured radially at spaced locations to receive demountable fasteners; a pair of demountable fasteners each having a shank receptive by an aperture of the grip member; a horn member comprising a pair of divergent arms and a connecting portion including a clamp journal; and end portion on each of said divergent arms being curved longitudinally in substantial correspondency with the curvature of the grip member, said end portions being convergent toward each other and apertured in registry with the apertures of said inner and outer wall surfaces of the grip member likewise to receive said demountable fasteners; said outer wall surfaces of the grip member being recessed to accommodate portions of the demountable fasteners.

10. The handlebar as specified by claim 9, wherein the end portions of the divergent arms and said demountable fasteners are disposed in the mean plane of the grip member.

References Cited

UNITED STATES PATENTS

| | | | |
|---|---|---|---|
| 944,932 | 12/1909 | Abraham | 74—551.8 |
| 1,448,921 | 3/1923 | Ershkowitz | 74—551.8 |
| 3,064,495 | 11/1962 | Quillery | 74—552 |

FRED C. MATTERN, Jr., Primary Examiner

F. D. SHOEMAKER, Assistant Examiner

U.S. Cl. X.R.

74—551.8